United States Patent [19]
Vio

[11] Patent Number: 4,536,296
[45] Date of Patent: Aug. 20, 1985

[54] DRILLING AND COMPLETION MUDS USEFUL AT ELEVATED TEMPERATURES

[75] Inventor: Lino Vio, Pau, France

[73] Assignee: Societe Nationale Elf Aquitaine, Courbevoie, France

[21] Appl. No.: 474,719

[22] Filed: Mar. 10, 1983

Related U.S. Application Data

[63] Continuation-in-part of Ser. No. 233,640, Feb. 12, 1981, abandoned.

[30] Foreign Application Priority Data

Feb. 14, 1980 [FR] France ............................ 80 03261
Jan. 16, 1981 [FR] France ............................ 81 00767

[51] Int. Cl.$^3$ ................................................ C09K 7/02
[52] U.S. Cl. ........................ 252/8.5 C; 252/8.5 A; 525/329.4; 525/374; 525/377
[58] Field of Search ............ 252/8.5 C, 8.5 A, 8.55 R

[56] References Cited

U.S. PATENT DOCUMENTS

| | | | |
|---|---|---|---|
| 2,718,497 | 9/1955 | Oldham et al. | 252/8.5 |
| 2,959,574 | 11/1960 | Woodberry | 252/8.5 X |
| 2,979,454 | 4/1961 | Fields et al. | 252/8.5 |
| 3,730,900 | 5/1973 | Perricone et al. | 252/8.5 |
| 3,764,530 | 10/1973 | Burland et al. | 252/8.5 |

FOREIGN PATENT DOCUMENTS

| | | | |
|---|---|---|---|
| 543543 | 7/1957 | Canada | 252/8.5 |
| 553011 | 2/1958 | Canada | 252/8.5 |

Primary Examiner—Herbert B. Guynn
Attorney, Agent, or Firm—Burgess, Ryan & Wayne

[57] ABSTRACT

The invention is clay based water drilling or completion muds with low viscosity and exceptional stability at elevated temperatures of up to 200° C. The muds are characterized by containing from 1 to 10 grams per liter of a low molecular weight polymer or copolymer having functional groups wherein from 2 to 95% of the functional groups consist independently of hydroxamic or thiohydroxamic groups. The mud composition comprises (a) fresh water, water containing electrolytes such as sodium chloride, potassium chloride, calcium chloride, magnesium chloride, or seawater; (b) clay, chosen to suit the saline concentration of the water and to provide the necessary properties; and (c) one or more viscosity increasing materials.

15 Claims, No Drawings

DRILLING AND COMPLETION MUDS USEFUL AT ELEVATED TEMPERATURES

CROSS REFERENCE TO RELATED APPLICATIONS

This application is a continuation-in-part of U.S. application Ser. No. 233,640 filed Feb. 12, 1981, now abandoned.

BACKGROUND OF THE INVENTION

The invention is directed to clay based drilling or completion muds containing polymer additives effective for drilling or completion operations at temperatures in the range of about 90° to 200° C. having increased thermal stability and reduced viscosity.

Drilling and completion muds must possess a number of sometimes contradictory physical and chemical properties, in order to perform their function properly. Consequently, water drilling muds generally contain a number of component ingredients, including: (a) fresh water or water containing electrolytes such as sodium chloride, potassium chloride or calcium chloride, or can be seawater; (b) clay, chosen to suit the saline concentration of the water and to provide the necessary rheological properties; (c) one or more viscosity increasing polymeric materials; (d) a fluid loss additive which can be a polymeric material; (e) a dispersant to reduce the viscosity of the clay by deflocculating it; and (f) one or more weighting or density increasing agents.

The present practice to drill with muds having low viscosities wherever the ground permits, and the problems caused by thickening of the mud at great depths, places considerable importance on dispersants in the formulation of water drilling muds. It is necessary when using low viscosity muds to keep the viscosity at the required level while retaining adequate thixotropic properties and suspensoid capacity; and when using high viscosity muds to prevent or at least limit a rise in viscosity.

Polyphosphates have been used extensively. However, polyphosphates are not stable at elevated temperatures. Lignin is an effective agent, but when contaminated by certain electrolytes, particularly calcium salts, it precipitates thereby losing its effectiveness.

Ferrochrome lignosulphonates, for example Brixel ™ NF 2 manufactured by CECA, are extremely effective up to a concentration of approximately 10 grams/liter (g/L) which is the limit of their dispersion effect; beyond that, they are used as plugging and fluid loss agents. Their action is not affected by calcium salts. However, they have only medium heat stability, which is a serious drawback for deep drilling operations. In addition, discharge of chromium salts which are toxic, is increasingly controlled for ecological reasons, and use of these complex lignosulphonates will probably be banned in the future.

Other dispersants comprise acrylic acid salts (as described in U.S. Pat. No. 3,764,530), which are not effective in the presence of electrolytes, and maleic anhydride and styrene sulphonate copolymers (as described in U.S. Pat. No. 3,730,900).

All dispersants do not function in the same way. However, it has been demonstrated for certain dispersants, such as ferrochrome lignosulphonate (in the article SPE 8225), and it seems likely for all such agents, that adsorption on laminated particles, on the faces or edges of such particles depending on the electron donor or acceptor functions in the dispersant, prevents the clay from flocculating or gelling, by preventing edge-to-face bonds common in clay suspensions, to an increase in the forces of repulsion and/or a reduction in the forces of attraction between particles.

Reduction in dispersion capacity at high temperature may have at least two causes, apart from those connected directly with drilling conditions: (a) chemical deterioration of the dispersant; and (b) desorption of the dispersant at the elevated temperature.

BRIEF SUMMARY OF THE INVENTION

This invention is directed to the use, as dispersants, of polymers or copolymers of low molecular weight, having functional groups wherein from about 2 to 95% of the functional groups are hydroxamic or thiohydroxamic groups. The polymeric compositions useful in the present invention form extremely stable complexes with transition metals, and thus can be effectively adsorbed on particles of clay, through the aluminum, calcium, magnesium, iron and other cations present in the clay.

When used at low concentrations, the dispersants of the present invention show an unexpectedly high level of effectiveness, in fresh or salt water, at temperatures up to about 250° C., as well as offering a significant plugging or fluid loss effect.

The new dispersion additives are hydrosoluble polymers or copolymers having a weight average molecular weight not higher than about 40,000, and preferably under about 10,000, containing hydroxamic or thiohydroxamic functional groups appended to the polymeric chain or backbone.

A thiohydroxamic functional group is a functional group formed from a hydroxamic group wherein one or more oxygen atoms have been replaced by sulfur atoms.

A hydroxamic acid contains the following group or derivative thereof:

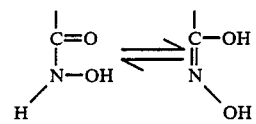

The hydroxamic functional groups can be appended directly to the main polymer chain:

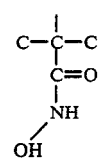

or through a moiety (F) which is itself fixed to the main chain:

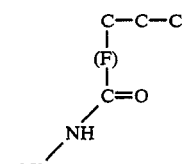

The hydroxamic or thiohydroxamic groups useful in the practice of the present invention have the general formula

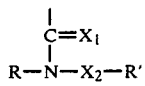

wherein R and R' are independently alkali metal, hydrogen, alkyl and cycloalkyl having from 1 to 18 carbon atoms, alkylene and cycloalkylene having from 2 to 18 carbon atoms, aryl, alkylaryl, arylaklyl, alkoxyaryl, alkoxy alkyl and the like having up to two conjugated rings and up to about 18 carbons and $X_1$ and $X_2$ are independently sulfur or oxygen.

DETAILED DESCRIPTION OF THE INVENTION

Procedures for synthesizing polymers or copolymers useful in the present invention having hydroxamic or thiohydroxamic functional groups are known. The polymeric materials can be prepared by polymerization or copolymerization of a vinyl monomer having a hydroxamic or thiohydroxamic functional group alone or with an other vinyl monomer. The polymeric materials can also be prepared by the chemical alteration of a hydrosoluble polymer, such as a polyacrylamide or copolyacrylamide partly hydrolyzed, unhydrolyzed or wholly hydrolyzed or a hydroxyalkyl polyacrylate by a hydroxylamine or thiohydroxylamine.

The polymers useful for the practice of the invention are polymers wherein between about 2 and 95% of the functional groups and preferably between about 5 and 65% of the functional groups are hydroxamic or thiohydroxamic groups.

Hydroxamic and thiohydroxamic functional groups as used in the present application means groups of the formula

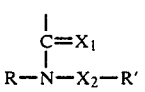

wherein $X_1$ and $X_2$ are independently selected from oxygen and sulfur and R and R' are independently alkali metal hydrogen, alkyl and cycloalkyl having from 1 to about 12 carbon atoms, alkylene and cycloalkylene having from 2 to about 18 carbon atoms, aryl, alkylaryl, arylalkyl, alkoxyaryl, alkoxyalkyl having up to two conjugated rings and heterocyclic moieties and having up to about 18 carbon atoms. R and R' can also have non-interfering substituents. Only one of R or R' can be alkali metal.

Examples of R and R' are Na, K, phenyl, tolyl, cresyl, tertiary butyl phenyl, biphenyl, benzyl, methoxyphenyl, allylphenyl, butoxyphenyl, methyl, ethyl, propyl, isopropyl, butyl, secondary butyl, decyl, ethenyl, propenyl, hexenyl, decenyl, cyclohexyl, cyclohexenyl, and the like. R and R' can also contain the above substituted with noninterfering substituents.

Hydroxamic and thiohydroxamic groups such as:

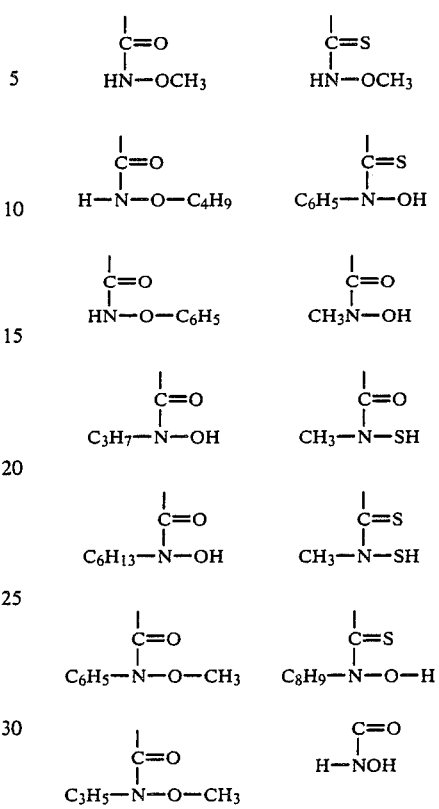

and the like are useful as the groups appended to the polymer chain.

The polymers useful for the present invention can be prepared by the reaction of a substituted or non-substituted hydroxylamine or thiohydroxylamine with homopolymers or copolymers of acrylamide, methacrylamide, alkylacrylamide, thioacrylamide, alkylthioacrylamide, hydroxyalkylacrylates with monomers such as acrylic acid, methacrylic acid, other alkyl acrylic acids, their esters and salts.

Suitable comonomers would include but are not limited to methylacrylate, sodium acrylate, maleic anhydride, vinyl acetate, vinyl pyrrolidone, butadiene, styrene, acrylonitrile and the like.

Polymers wherein one or more hydrogens of the amide group are substituted with alkyl, cycloalkyl, allyl, aryl and the like can also be utilized to form the polymers having the amide groups appended thereto for reaction with a hydroxylamine or thiohydroxylamine. The polyacrylamide can be hydrolyzed, partially hydrolyzed or unhydrolyzed.

The polymers useful in the practice of the present invention which have been reacted with the hydroxylamine or thiohydroxylamine have a weight average molecular weight not higher than about 40,000 and preferably less than about 20,000 and more preferably between about 1,000 and 10,000 and most preferably between about 1,200 and 6,000.

The polymers useful in the practice of the present invention have between about 2 and 95% of the total number of functional groups appended to the polymer chain of a hydroxamic or thiohydroxamic type. The percent substitution or percent reaction is the ratio of the number of hydroxamic or thiohydroxamic functional groups to the total number of appended groups times 100.

The polymers useful in the practice of the present invention are prepared by reacting an amine of the formula R'—NHOR wherein R and R' are defined above with the amide groups of an aqueous solution or dispersion of a polymer having appendant amide groups. The reaction can be carried out at a temperature between about 50° and 110° C., more preferably between about 60° and 90° C. and most preferably between about 65° and 85° C. for a sufficient length of time to substitute between 2 and 95% of the functional groups pendent to the polymer chain with hydroxamic, thiohydroxamic, substituted hydroxamic or substituted thiohydroxamic groups as set forth above. Preferably from about 10 to 65% of the groups are functional hydroxamic or thiohydroxamic groups and most preferably between about 15 and 55%.

The reaction is generally carried out in the absence of oxygen and at a pH in the range of about 5 to 7.5 and preferably from about 6 to 7. pH values in the range of about 6.2 to 6.8 are especially preferred.

The hydroxylamine or thiohydroxylamine or derivatives thereof are provided in a ratio to the amide moieties appendant to the polymer chain between about 0.2 to 1.2 and preferably from about 0.35 to 0.65 and most preferably from about 0.4 to 0.6.

The hydroxylamine or thiohydroxylamine, whether substituted or not are reacted with the amide containing polymer for a sufficient length of time to obtain the amount of substitution desired. Generally the reaction is carried out for from about 0.5 to 20 hours and preferably from about 1 to 8 hours.

Any unreacted hydroxylamine or thiohydroxylamine can be stripped out of the reaction mixture along with ammonia formed during the reaction. The reaction mixture can be used as formed or the modified polymer can be purified. One method of purifying the polymer is separating the polymer from the reaction mixture by precipitation, the precipitated polymers are washed and dried to form a purified material.

The reaction between the polyamide and the hydroxylamine or thiohydroxylamine is generally carried out under a blanket of inert gas such as nitrogen or carbon dioxide to prevent the oxygen from reacting with the hydroxylamines or thiohydroxylamines.

In preparing the polyhydroxamic or polythiohydroxamic polymeric materials, a salt of the hydroxylamine or thiohydroxylamine is generally used. Salts such as the hydrochloride, sulphate, acetate, phosphate and the like are suitable. Additional electrolytes can be added to the reaction mixture to increase the rate of reaction.

The reaction is carried out by preparing an aqueous mixture of the polyamide and hydroxylamine. The pH of the mixture is adjusted to a range between about 5 and 7.5 and preferably between about 6.0 and 7.0. The temperature is then raised to the desired level and maintained at the desired level until the required amount of reaction between the amide groups and the hydroxylamine occurs. The course of reaction can be followed by removing a sample of the reaction mixture and analyzing the polymer to determine the amount of reaction which has occurred.

The invention is illustrated by, without being confined to the following Examples, describing preparation of polyhydroxamic acids, preparation of muds to which between 1 and 10 g/L of the dispersant is added, and tests to compare the muds with others containing dispersants known in the prior art.

EXAMPLE 1

Preparation of a polyhydroxamic acid (PHA)

82 g sodium acetate and 70 g hydroxylamine hydrochloride were added to an aqueous solution containing 10% polyacrylamide with a molecular weight of less than 20,000.

The solution was agitated and heated to 90° C. for 10 hours. The polymer was then precipitated in ethanol, dried, and analyzed. There was a 52% substitution of the amide groups with hydroxamic groups.

EXAMPLE 2

Preparation of mud

The mud was prepared in a Hamilton Beach mixer and its container, holding ½ liter fresh water or brine. With the agitator in operation, the selected quantity of dispersant for testing was added, then the clay or clays, and any other additives, such as polymer, pH regulator, and biocide. Agitation continued for 20 minutes, after which the following tests were performed, using a FANN viscometer with concentric cyclinders, as stipulated in standards:

(a) measurement of viscosity in a FANN 35 at 600 rpm (1,020 sec$^{-1}$);

(b) API filtrate measurement: quantity of water collected in ½ hour, during filtration of the mud through standard substrate and filter, at a pressure of 100 psi (7 kg/cm$^2$).

EXAMPLE 3 TO 10

Mud was prepared using the procedure described in Example 2, with fresh water and 80 g/liter FB 2 bentonite dispersion, as the control.

Table 1, hereinafter, shows the effect on viscosity and filtrate measurements of the concentration of polymers added as dispersants (temperature: 25° C.).

TABLE I

| | Temperature: 25° C. | | |
|---|---|---|---|
| Example | | Viscosity in centipoises in FANN at 600 rpm | Filtrate in cc in 30 min. at 100 psi |
| 3 | Control Polyacrylic acid (PAA) | 9 | 23 |
| 4 | 0.13 g/l | 20.5 | 23.5 |
| 5 | 1.3 g/l Polyhydroxamic acid (PHA) (Ex. 1) | 4 | 9.5 |
| 6 | 0.05 g/l | 9 | 22 |
| 7 | 0.25 g/l | 7 | 24 |
| 8 | 0.5 g/l Brixel NF 2* | 4.5 | 28 |
| 9 | 5 g/l | 5.5 | 15.5 |
| 10 | 15 g/l | 6 | 10 |

*Brixel NF 2 is a ferrochrome lignosulphonate marketed by CECA.

The polyacrylic acid was produced synthetically in the laboratory. It had a molecular weight of under 10,000.

Although the concentration of bentonite was low, these first tests showed the marked dispersion effect of low molecular-weight polyacrylic and polyhydroxamic acids.

It should be noted that a very low concentration of polyacrylic acid has the opposite effect; a similar concentration of polyhydroxamic acid does not seem to possess any fluid loss effects.

EXAMPLES 11 TO 15

To increase initial viscosity and obtain more meaningful results, further tests were performed on a mud containing:
50 g/l CECA Clarsol FB 2 bentonite;
150 g/l filler clay.

Table II hereinafter shows the results of the tests.

These results confirmed earlier ones, showing the effectiveness of the two polymers in dispersing clays in fresh water.

EXAMPLES 15 TO 20

PHA of Example 1 was tested in a mud containing seawater, 150 g/l filler clay, and 100 g/l bentonite (CECA Clarsol FB 7).

Table III hereinafter shows the results of the test.

As in fresh water, but at a high concentration, PHA ensures satisfactory clay dispersion.

This made it worth investigating its effectiveness at high temperatures, which was done in several stages.

TABLE II

Temperature: 25° C.

| Example | | Viscosity in centipoises in FANN at 600 rpm | Filtrate in cc in 30 min. at 100 psi |
|---|---|---|---|
| 11 | Control | 32 | 19 |
| 12 | 15 g/l Brixel NF 2 | 15 | 9 |
| 13 | 1.3 g/l PAA | 7.5 | 9 |
| 14 | 1 g/l PHA of Example 1 | 9.5 | 20 |

TABLE III

Temperature: 25° C.

| Example | | Viscosity in centipoises in FANN at 600 rpm | Filtrate in cc in 30 min. at 100 psi |
|---|---|---|---|
| 15 | Control | 43 | 65 |
| 16 | 15 g/l Brixel NF 2 | 19.5 | 40 |
| | PHA of Example 1 | | |
| 17 | 1 g/l | 18.5 | 78 |
| 18 | 2.6 g/l | 9.5 | 80 |
| 19 | 5.2 g/l | 7 | 96 |
| 20 | 7.8 g/l | 8 | 90 |

EXAMPLES 21 TO 24

Dispersants were tested at a temperature of 90° C., using a seawater mud containing:
100 g/l Clarsol FB 7 bentonite;
150 g/l filler clay.

Measurements were taken at 0 hours, and after 5, 14 and 28 days.

Table IV hereinafter shows the results of measurements.

Prolonged heating to 90° C. resulted in a marked drop in the effectiveness of Brixel NF 2 and polyacrylic acid, but the dispersion effect of polyhydroxamic acid remained very high, and fluid loss properties improved with lapse of time.

EXAMPLES 25 TO 28

Dispersants were tested at 130° C. with muds containing:
distilled water;
50 g/l FB 2 clay;
200 g/l filler clay.

Table V attached hereto shows the results of measurements taken at 0 hours, and after 1, 3, 5 and 14 days.

The remarkable effectiveness of polyhydroxamic acid is even more obvious than at 90° C. heating helps to improve its plugging effect.

In contrast, polyacrylic acid no longer performs effectively as a dispersant at this temperature, and lignosulphonate loses much of its dispersion and fluid loss.

TABLE IV

| Example | | Viscosity in centipoises in FANN at 600 rpm | | | | Filtrate in cc in 30 min. at 100 psi | | | |
|---|---|---|---|---|---|---|---|---|---|
| | | 0 | 5d | 14d | 28d | 0 | 5d | 14d | 28d |
| 21 | Control | 43 | 49.5 | 51 | 45 | 65 | 58 | 58 | 55 |
| 22 | 15 g/l Brixel | 19.5 | 32 | 35 | 35 | 40 | 38 | 37 | 40 |
| 23 | 7.8 g/l PAA | 11.5 | 19.5 | 19.5 | 20.5 | 45 | 40 | 41 | 50 |
| 24 | 7.8 g/l PHA of Ex. 1 | 8 | 10 | 13 | 12.5 | 90 | 53.5 | 45 | 46 |

TABLE V

| Example | | Viscosity in centipoises in FANN at 600 rpm | | | | | Filtrate in cc in 30 min. at 100 psi | | | | |
|---|---|---|---|---|---|---|---|---|---|---|---|
| | | 0 | 1d | 3d | 5d | 14d | 0 | 1d | 3d | 5d | 14d |
| 25 | Control | 40 | 56 | 55 | 50 | 50 | 21 | 23 | 30 | 31 | 30 |
| 26 | 10 g/l Brixel NF 2 | 17.5 | 26.5 | 29 | 31.5 | 32 | 13 | 27 | 35 | 39 | 30 |
| 27 | 5 g/l PAA (Ex. 1) | 15.5 | 62.5 | 61 | 55 | 60 | 8 | 9 | 9 | 8 | 7 |
| 28 | 5 g/l PHA (Ex. 1) | 10.5 | 10 | 12 | 13 | 18 | 21 | 12 | 13 | 12 | 12 |

EXAMPLES 29 AND 30

Brixel NF 2 and PHA (Example 1) were tested at 175° C. in a mud containing:
50 g/l FB 2 bentonite;
200 g/l filler clay;
dispersed in fresh water.

Since polyacrylic acid had proved ineffective at 130° C., it was not tested at this higher temperature.

Table VI hereinafter shows the results of measurements, taken at 0 hours, and after 1, 2, 5 and 9 days.

There is a sharp drop in the performance of Brixel NF 2 when heating begins, although it later stabilizes; on the other hand, the dispersion effect of polyhydroxamic acid remains excellent at 175° C., and as indicated previously, heated of the mud improves its fluid loss properties.

EXAMPLES 31 TO 34

Tests were performed on Brixel NF 2 and PHA at 200° C., to investigate the effects of the PHA (Example 1) concentration in a mud containing:

50 g/l FB 2 bentonite;
200 g/l filler clay;
dispersed in fresh water.

Table VII hereinafter, shows the results of measurements, taken at 0 hours, and after 1, 3 and 7 days.

These results reveal that Brixel ™ NF 2 very quickly loses its dispersion properties at 200° C., whereas polyhydroxamic acid continues to maintain very low viscosity in clay dispersions, at concentrations ranging from 1 to 3 g/l, under testing conditions.

In addition, fluid loss properties remain very good after 7 days heating to 200° C.

TABLE VI

| Example | | Viscosity in centipoises in FANN at 600 rpm | | | | | Filtrate in cc in 30 min. at 100 psi | | | | |
|---|---|---|---|---|---|---|---|---|---|---|---|
| | | 0 | 1d | 2d | 5d | 9d | 0 | 1d | 2d | 5d | 9d |
| 29 | 10 g/l Brixel NF 2 | 17 | 33 | 36 | 31 | 33 | 13 | 35 | 36 | 35 | 36 |
| 30 | 5 g/l PHA of Ex. 1 | 11.5 | 11.5 | 12.5 | 11 | 11.5 | 23 | 15 | 13 | 13 | 14 |

TABLE VII

| Example | | Viscosity in centipoises in FANN at 600 rpm | | | | Filtrate in cc in 30 min. at 100 psi | | | |
|---|---|---|---|---|---|---|---|---|---|
| | | 0 | 1d | 3d | 7d | 0 | 1d | 3d | 7d |
| 31 | 10 g/l Brixel NF 2 | 19.5 | 37 | 37 | 32 | 15 | 34 | 34 | 40 |
| 32 | 1 g/l PHA Ex. 1 | 19 | | 25 | | 21 | | 23 | |
| 33 | 3 g/l PHA Ex. 1 | 12.5 | | 10 | | 21 | | 15 | |
| 34 | 5 g/l PHA Ex. 1 | 11 | 10.5 | 10 | 10.5 | 22 | 12 | 13 | 15 |

TABLE VIII

| Example | | Viscosity in centipoises in FANN at 600 rpm | | | | Filtrate in cc in 30 min. at 100 psi | | | |
|---|---|---|---|---|---|---|---|---|---|
| | | 0 | 1d | 3d | 7d | 0 | 1d | 3d | 7d |
| 35 | Control | 46.6 | 62 | 95 | 92 | 130 | All in 20' | All in 5' | All in 10' |
| 36 | 10 g/l Brixel ™ NF 2 | 19 | 70 | 77.5 | 78 | 85 | All in 25' | All in 10' | All in 10' |
| 37 | 5 g/l PHA Ex. 1 | 10 | 5 | 6.5 | 7 | All in 20' | 140 | 160 | 160 |
| 38 | 5 g/l Miltemp | 15 | 25 | 42 | 70 | 95 | All in 30' | All in 30' | All in 10' |

TABLE IX

| Example | | Viscosity in centipoises in FANN at 600 rpm | | | | Filtrate in cc in 30 min. at 100 psi | | | |
|---|---|---|---|---|---|---|---|---|---|
| | | 0 | 1d | 3d | 7d | 0 | 1d | 3d | 7d |
| 39 | 10 g/l Brixel ™ NF 2 | 25 | 80 | 80 | 85 | 125 | All in 5' | All in 5' | All in 5' |
| 40 | 5 g/l PHA Ex. 1 | 4 | 5.5 | 4 | 4 | All in 5' | All in 20' | All in 20' | All in 20' |

EXAMPLES 35 TO 38

Tests were performed on Brixel ™ NF 2, PHA (Example 1) and Miltemp, a styrene sulphonate and maleic anhydride copolymer, at 200° C., in a mud containing 80 g/l attapulgite dispersed in seawater.

Table VIII hereinabove, shows the results of measurements, taken at 0 hours and after 1, 3 and 7 days.

Under these difficult conditions, the excellent dispersion effect of polyhydroxamic acid was even more noticeable.

EXAMPLES 39 AND 40

Tests were performed to compare Brixel NF 2 and the polyhydroxamic acid described in Example 1, at 200° C., using a mud containing 80 g/l attapulgite dispersed in water containing 100 g/l KCl.

Table IX hereinabove, shows the results of measurements, taken at 0 hours and after 1, 3 and 7 days.

EXAMPLES 41 AND 42

The same procedure was followed as in Examples 35 to 38, but using a mud containing 80 g/l attapulgite, dispersed in water saturated with NaCl.

Table X hereinafter, shows the results of measurements taken at 0 hours, and after 1, 3 and 7 days.

EXAMPLES 43 AND 44

Tests were performed at 200° C. to compare the sulphonic styrene acid and maleic anhydride copolymer described in U.S. Pat. No. 3,730,900, and sold under the registered trade mark Miltemp ®, with the polyhydroxamic acid described in Example 1, using a mud containing:

28.5 g/L Wyoming bentonite;
47.0 g/L barium sulphate, as weighing agent;
2.15 g/L carboxymethylcellulose;
dispersed in city water.

TABLE X

| Example | | Viscosity in centipoises in FANN at 600 rpm | | | | Filtrate in cc in 30 min. at 100 psi | | | |
|---|---|---|---|---|---|---|---|---|---|
| | | 0 | 1d | 3d | 7d | 0 | 1d | 3d | 7d |
| 41 | 10 g/l Brixel NF 2 | 32 | 80 | 85 | 100 | 130 | All in 20' | All in 5' | All in 5' |
| 42 | 5 g/l PHA Ex. 1 | 6 | 5 | 6.5 | 6 | All in 10' | All in 10' | All in 30' | All in 30' |

TABLE XI

| Example | | Viscosity in centipoises in FANN at 600 rpm | | | | Filtrate in cc in 30 min. at 100 psi | | | |
|---|---|---|---|---|---|---|---|---|---|
| | | 0 | 1d | 3d | 7d | 0 | 1d | 3d | 7d |
| 43 | 3 g/l Miltemp | 5 | | 12.5 | 12 | 30 | | | |
| 44 | 3 g/l PHA of Ex. 1 | 6 | | 6 | 10 | 17 | | | |

Table XI, hereinabove, shows the results of measurements, taken at 0 hours, and after 1, 3 and 7 days.

The invention also concerns a new method of preparing polyhydroxamic acids, in which a polyacrylamide and a hydroxylamine hydrochloride react together in a solution of which the pH value is adjusted to between 5 and 7.5 by means of alkaline or alkaline-earth hydroxides.

The invention is illustrated by, without being confined to, the following examples.

EXAMPLE 45

Preparation of polyhydroxamic acid (PHA)

22.5 g of KOH pellets and then 35 g hydroxylamine hydrochloride were added to 0.8 liter of an aqueous solution containing 10% of polyacrylamide having a molecular weight lower than 12,000.

The solution was agitated and heated to 90° C. for 10 hours, after which the polymer was precipitated in ethanol, dried, and analyzed. 31% of the amide groups were found to be hydroxamic acid groups.

EXAMPLES 46 AND 47

The PHA described in Example 45 was added to a mud containing baryta as a weighting agent, and tested for comparison with the same mud to which CECA Brixel TM NF 2 ferrochrome lignosulphonate has been added.

The weighted mud contained:
fresh water;
5 g/l Novacel R 110 carboxymethylcellulose;
1 500 g/L baryta;
4 g/L caustic soda;
CECA Clarsol FB 5 bentonite.

TABLE XII

| Example | | Viscosity in centipoises in FANN at 600 rpm | | Filtrate in cc in 30 min. at 100 psi | |
|---|---|---|---|---|---|
| | | 60 g/l FB 5 | 140 g/l FB 5 | 60 g/l FB 5 | 140 g/l FB 5 |
| 46 | 15 g/l Brixel NF 2 | 35 | 100 | 3 | 3 |
| 47 | 5 g/l PHA Ex. 45 | 28 | 82 | 4 | 3 |

TABLE XIII

| Example | | Viscosity in centipoises in FANN at 600 rpm | Filtrate in cc in 30 min. at 100 psi |
|---|---|---|---|
| 49 | Control | 100 | 20 |
| 50 | 9 g/l PHA Ex. 48 | 70 | 7 |

Table XII hereinafter shows the results of measurements.

These results show that ferrochrome lignosulphonate can advantageously be replaced by a smaller concentration of PHA, in baryta-weighted mud.

EXAMPLE 48

The procedure described in Exmaple 45 was followed, except that the following quantities of reagents were used:
0.8 liters of a solution containing 10% polyacrylamide with a molecular weight of 8,000;
22.5 g KOH;
25 g hydroxylamine hydrochloride.

This produced PHA with 17% of the amide groups reacted to hydroxamic groups.

EXAMPLES 49 AND 50

The PHA described in Example 48 was tested in a completion mud containing calcium carbonate as a weighting agent, and also containing:
fresh water;
2 g/l caustic soda;
4 g/l sodium chloride;
4 g/l Drispac Superlo carboxymethyl cellulose;
2 300 g/l Durcal 10 calcium carbonate.

Table XIII hereinabove shows the results of measurements.

EXAMPLES 51 TO 59

TABLE XIV

| Example | | Length of aging | Apparent viscosity | Plastic viscosity | Yield value* | API filtr. |
|---|---|---|---|---|---|---|
| 51 | 10 g/l Brixel TM NF 2 | 0 | 54 | 33 | 42 | 15 |
| 51 | 10 g/l Ex. 45 PHA | 0 | 50 | 34 | 32 | 16.5 |
| 53 | 10 g/l Brixel NF 2 | 1 day | 65 | 37 | 56 | 10 |
| 54 | 10 g/l Ex. 48 PHA | 0 | 51 | 35 | 32 | 16 |
| 55 | 10 g/l Ex. 48 PHA | 1 day | 46 | 37 | 18 | 9.5 |

TABLE XIV-continued

| Example | | Length of aging | Apparent viscosity | Plastic viscosity | Yield value* | API filtr. |
|---|---|---|---|---|---|---|
| 56 | 10 g/l Brixel NF 2 | 3 days | 45 | 27 | 36 | 28 |
| 57 | 10 g/l Ex. 45 PHA | 3 days | 30 | 30 | 0 | 14 |
| 58 | 10 g/l Brixel NF 2 | 7 days | 64 | 26 | 76 | 30 |
| 59 | 10 g/l Ex. 48 PHA | 7 days | 35 | 35 | 0 | 15 |

*Difference between apparent and plastic viscosities.

Tests were performed on the heat resistance of gypsum mud, weighted with baryta, and treated with a ferrochrome lignosulphonate or PHA, and containing:
fresh water;
4 g/l soda;
5 g/l Novacel R 110 Carboxymethyl cellulose
140 g/l Clarsol FB 2 bentonite;
30 g/l gypsum;
1500 g/l baryta.

Aging took place at 160° C.

Table XIV hereinafter, shows the results of measurements.

All these examples demonstrate that: polyhydroxamic acids with low molecular weight are good dispersants for drilling or completion muds:
in fresh water;
in seawater;
in synthetic salt water;
concentrations required are lower than for other dispersants.

They remain effective in the presence of weighting agents such as calcium carbonate or baryta, and this property is unchanged even after prolonged heating, being much greater than that of products regarded as most stable under the effect of heat; in addition such polymers become excellent fluid loss agents after heating of mud.

EXAMPLES 60-67

An amount of 1 kilogram of a 24% by weight aqueous solution of a copolyacrylamide having a ratio of the monomers to acrylamide and molecular weight shown in Table XV was mixed with 117.5 g of hydroxylamine hydrochloride and the pH of the mixture was adjusted to 6.4 with KOH. The mixture was heated according to the schedule shown on the Table and the amount of hydroxamic substitution at the end of the reaction is shown on the Table.

Ten grams of the composition prepared in Example 63 was included in a mixture containing 1,000 g of water, 200 g of clay and 50 g of bentonite FB2 (Clarsol FB 2). The viscosity was determined by a FANN 35 viscosimeter at 600 rpm at 20° C. The reference composition had a viscosity of 27.5 CP the composition containing the product of Example 63 was 7.0 CP.

TABLE XV

| Example No. | Co-motif | Mol. weight | Heating Schedule | % Hydroxamic Groups |
|---|---|---|---|---|
| 60 | Ethyl thioacrylate 30/70 | 5000 | 6 hrs. at 70° C. | 21 |
| 61 | Methylol-acrylamide 20/80 | 2000 | 6 hrs. at 70° C. 1 hr. at 90° C. | 30 |
| 62 | Maleic anhydride 10/90 | 1500 | 6 hrs. at 70° C. 1 hr. at 90° C. | 40 |
| 63 | Sodium acrylate 30/70 | 3000 | 6 hrs. at 70° C. 1 hr. at 90° C. | 28 |
| 64 | Methylacrylamide 30/70 | 3000 | 6 hrs. at 70° C. 1 hr. at 90° C. | 33 |
| 65 | Acrylonitrile 30/70 | 4000 | 6 hrs. at 70° C. 1 hr. at 90° C. | 36 |
| 66 | Methyl acrylate 25/75 | 2500 | 6 hrs. at 70° C. 1 hr. at 90° C. | 31 |
| 67 | Ethyl methacrylate | 2800 | 6 hrs. at 70° C. 1 hr. at 90° C. | 27 |

The experiment indicates that reaction to form the hydroxamic groups proceeds faster with some polymers than with others.

EXAMPLES 68-76

An amount of 1 kilogram of an aqueous solution containing 24% by weight of a polyacrylamide having a weight average molecular weight of 1500 was mixed with an amount of a substituted hydroxylamine hydrochloride to provide 0.5 substituted hydroxylamine groups for each amide group. The pH of the mixture was adjusted to 6.4 with KOH. The mixture was heated at 70° C. for 6 hours and at 85° C. for 2 hours. The substituted hydroxylamine and the percent of substituted hydroxamic acid substituted in the polymer is shown in Table XVI.

The substituted hydroxamic polymers produced have usefulness as dispersants in drilling and completion muds.

The invention is not confined to the Examples and embodiments described above; many variant forms are possible for someone skilled in the art, depending on applications, and without any departure from the spirit of the invention.

TABLE XVI

| Ex. No. | Substituted hydroxylamine | % Substituted Hydroxamic Group |
|---|---|---|
| 68 | $NH_2OCH_3$ | 30 |
| 69 | $NH_2OC_4H_9$ | 32 |
| 70 | $NH_2OC_6H_5$ | 28 |
| 71 | $CH_3NHOH$ | 31 |
| 72 | $C_3H_7NHOH$ | 29 |
| 73 | $C_6H_{13}NHOH$ | 35 |
| 74 | $CH_3NHOH$ | 29 |
| 75 | $C_6H_5NHOH$ | 26 |
| 76 | $C_6H_5NHOCH_3$ | 19 |

What is claimed is:

1. A clay based aqueous drilling or completion mud comprising clay, density increasing material, viscosity increasing agent, and from 1 to 10 grams per liter of a hydrosoluble polymeric material having pendant groups and a weight average molecular weight not higher than about 40,000, wherein from about 2 to 95% of the pendant groups are independently hydroxamic or thiohydroxamic groups of the formula:

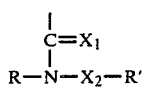

wherein $X_1$ and $X_2$ are independently oxygen, or sulfur and R and R' are independently hydrogen, alkyl or cycloalkyl having from 1 to about 18 carbon atoms, alkylene and cycloalkylene having from about 2 to 18 carbon atoms, aryl, alkylaryl, arylalkyl, alkoxyaryl, and alkoxyalkyl, having up to two conjugated rings, and having up to about 18 carbon atoms and wherein said polymeric material before the introduction of the hydroxamic or thiohydroxamic groups, is a homopolymer of acrylamide, methacrylamide, alkylacrylamide, thioacrylamide, alkylthioacrylamide, and hydroxyalkylacrylates, or copolymers of a monomer selected from acrylamide, methacrylamide, alklyacrylamide, thioacrylamide, alkylthioacrylamide, and hydroxyalkylacrylates and a monomer selected from acrylic acid, alkylacrylic acid, salts of acrylic acid and alkylacrylic acid, esters of acrylic acid and alkylacrylic acid, maleicanhydride, vinylacetate, vinyl pyrrolidone, butadiene, styrene and acrylonitrile.

2. The mud of claim 1 wherein the polymeric material has a molecular weight less than about 20,000.

3. The mud of claim 1 wherein the polymeric material has a molecular weight between about 1,000 and 20,000.

4. The mud of claim 1 wherein the polymeric material has a molecular weight between about 1200 and 6000.

5. Drilling muds as defined in claim 1, in which the dispersant is obtained by the reaction of hydroxylamine hydrochloride with an aqueous solution or inverse emulsion of polyacrylamide, with a molecular weight lower than 20,000 in the presence of sodium acetate.

6. Drilling muds as defined in claim 1, in which the dispersant is obtained by the reaction of an aqueous solution or inverse emulsion of a polyacrylamide, with a molecular weight lower than 20,000, with a hydroxylamine hydrochloride, at a temperature of 90° C., alkali metal or alkaline earth-metal hydroxide being used to adjust the pH value of the reaction mixture to between 5 and 7.5.

7. The mud of claim 1 wherein the pendant group is a hydroxamic group.

8. The mud of claim 7 wherein the polymeric material has a molecular weight less than about 20,000.

9. The mud of claim 7 wherein the polymeric material has a molecular weight between about 1,000 and 20,000.

10. The mud of claim 7 wherein the polymeric material has a molecular weight between about 1200 and 6000.

11. A mud of claim 7 wherein the polymeric material is a polyhydroxamic acid wherein from about 5 to 65% of the pendant groups are hydroxamic groups.

12. A mud of claim 8 wherein the polymeric material is a polyhydroxamic acid wherein from about 5 to 65% of the pendant groups are hydroxamic groups.

13. A mud of claim 9 wherein the polymeric material is a polyhydroxamic acid wherein from about 5 to 65% of the pendant groups are hydroxamic groups.

14. A mud of claim 10 wherein the polymeric material is a polyhydroxamic acid wherein from about 5 to 65% of the pendant groups are hydroxamic groups.

15. A mud of claim 10 wherein the polymeric material is a polyhydroxamic acid containing about 5 to 50% hydroxamic groups.

* * * * *